United States Patent
Lüdtke

(10) Patent No.: US 12,012,694 B2
(45) Date of Patent: Jun. 18, 2024

(54) PULPER FOR CIRCULATING A FIBROUS STOCK SUSPENSION

(71) Applicant: Voith Patent GmbH, Heidenheim (DE)

(72) Inventor: Oliver Lüdtke, Ravensburg (DE)

(73) Assignee: Voith Patent GmbH, Heidenheim (DE)

(*) Notice: Subject to any disclaimer, the term of this patent is extended or adjusted under 35 U.S.C. 154(b) by 775 days.

(21) Appl. No.: 17/076,294

(22) Filed: Oct. 21, 2020

(65) Prior Publication Data

US 2021/0032811 A1 Feb. 4, 2021

Related U.S. Application Data

(63) Continuation of application No. PCT/EP2019/057022, filed on Mar. 21, 2019.

(30) Foreign Application Priority Data

Apr. 23, 2018 (DE) ...................... 10 2018 109 634.8

(51) Int. Cl.
*D21D 5/04* (2006.01)
*D21B 1/34* (2006.01)

(52) U.S. Cl.
CPC ............... *D21B 1/347* (2013.01); *D21D 5/04* (2013.01)

(58) Field of Classification Search
CPC .................................. D21B 1/347; D21D 5/04
See application file for complete search history.

(56) References Cited

U.S. PATENT DOCUMENTS

| 3,073,535 A | 1/1963 | Vokes |
| 5,665,207 A | 9/1997 | Aikawa |
| 2007/0114311 A1* | 5/2007 | Fukudome ............. D21B 1/345 241/46.017 |

FOREIGN PATENT DOCUMENTS

| DE | 196 49 764 A1 | 6/1997 |
| DE | 101 16 367 A1 | 10/2002 |
| DE | 102 48 261 B3 | 3/2004 |
| DE | 102 48 259 A1 | 5/2004 |
| DE | 10 2005 007 972 A1 | 8/2006 |
| DE | 10 2011 005 024 A1 | 9/2012 |

(Continued)

OTHER PUBLICATIONS

Notification of the Transmission of the International Search Report and Written Opinion of the International Search Authority or Declaration dated May 29, 2019 for International Application No. PCT/EP2019/057022 (13 pages).

(Continued)

*Primary Examiner* — Jacob T Minskey
(74) *Attorney, Agent, or Firm* — Taylor IP, P.C.

(57) ABSTRACT

A pulper for circulating a fibrous stock suspension. The pulper includes at least one screen, having a screen surface which is provided with screen openings, and over which a rotor passes. The rotor is formed by a rotor head, to which a plurality of rotor blades are attached on the outer circumference. The rotor circle of the screen, which is passed over by the rotor wings, includes a plurality of bar-shaped elevations. In the process, pulping is to be improved, while wear is to be minimized, in that the angle of intersection between the working edge of the rotor blades pointing in the direction of rotation and the shear edge of the elevations pointing counter to the direction of rotation does not decrease radially outwardly.

20 Claims, 4 Drawing Sheets

(56) References Cited

FOREIGN PATENT DOCUMENTS

EP   1 609 904 A1   12/2005
EP   1 679 403 A1   7/2006

OTHER PUBLICATIONS

German Office Action dated Dec. 3, 2018 for German Application No. 10 2018 109 634.8 (10 pages).

* cited by examiner

Fig. 6
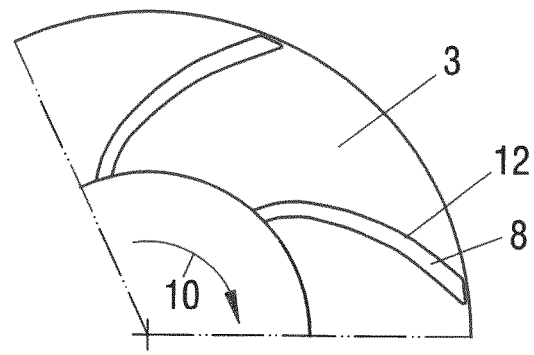
Fig. 7
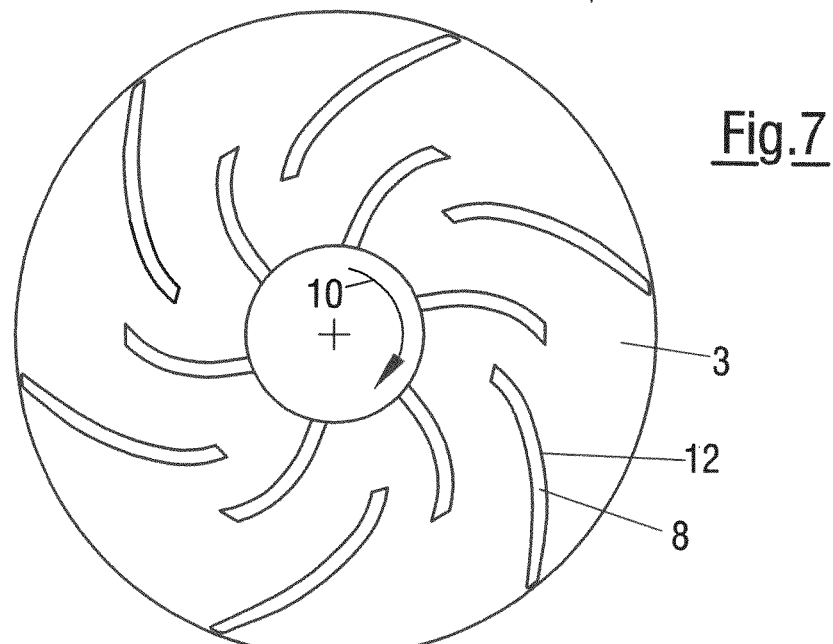
Fig. 8
Fig. 9
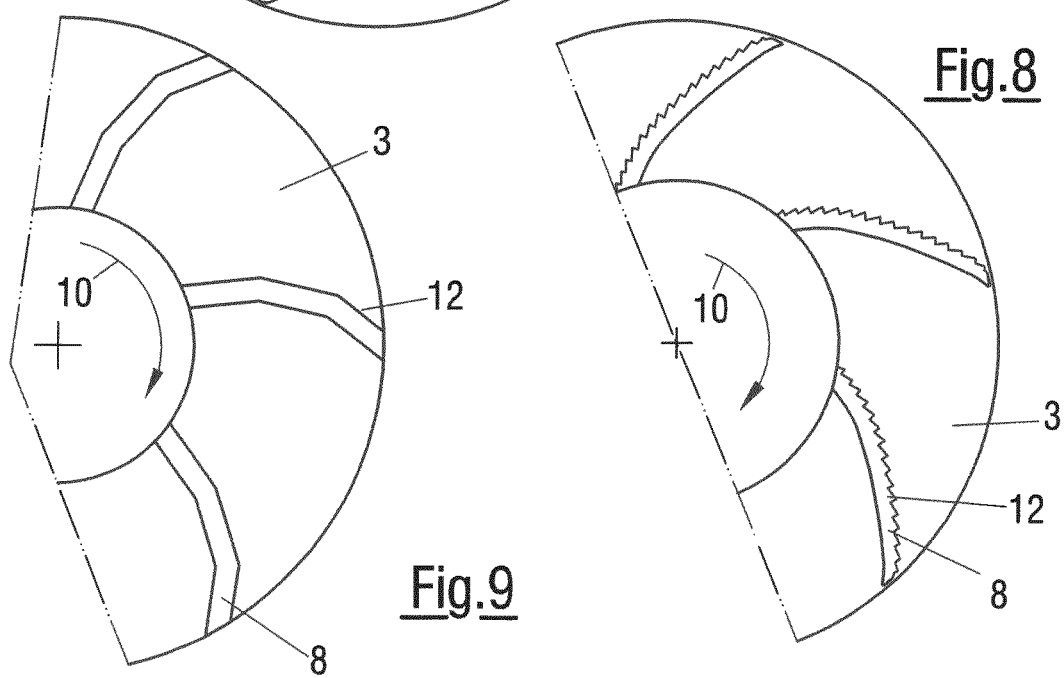

PULPER FOR CIRCULATING A FIBROUS STOCK SUSPENSION

CROSS REFERENCE TO RELATED APPLICATIONS

This is a continuation of PCT application No. PCT/EP2019/057022, entitled "PULPER", filed Mar. 21, 2019, which is incorporated herein by reference.

BACKGROUND OF THE INVENTION

1. Field of the Invention

The invention relates to a pulper for circulating a fibrous stock suspension which is present in a vat.

2. Description of the Related Art

Pulpers are used to treat raw fiber materials, which are to be used in the form of a fibrous stock suspension in a machine for producing a fibrous web, and in particular a paper web. For example, fresh fibers or recovered paper fibers can be used as raw fiber materials in the process. For this purpose, the pulper and downstream devices are intended to comminute the raw fiber materials to yield individual fibers.

Pulpers generally include a screen plate including a rotor, which is to comminute the raw fiber material and suspend it in water. The accepted materials pass the screen openings, while the undesirable substances, such as foreign substances, are held back by the screen and removed.

The bars attached to such screens are usually intended to protect the screen element against wear. For this reason, these are also often made of particularly wear-resistant material, such as hard metal. In addition to the wear-reducing effect, however, they may also improve the function of the sorting device. Since the rotor blades are moved relatively closely past the screen element, the relative movement may create additional vortices, which favor the sorting opening being kept free. In the case of flake-containing fibrous stock, the cooperation between the rotor blade and the bar can achieve an extensive desirable pulping of the flakes.

Due to the wear, however, the distance between the rotor blades and the bars as well as the screen surface increases, which adversely affects pulping and efforts to keep the screen surface free, and thus also the specific energy requirement of the entire recovered paper treatment system. In addition, the wear increases with increasing contamination of the raw materials, so that the elements have to be replaced frequently.

What is needed in the art is a pulper which improves pulping, while at the same time minimizing wear and the energy requirement.

SUMMARY OF THE INVENTION

The invention provides a pulper that includes at least one screen, having a screen surface which is provided with screen openings and over which a rotor passes, wherein the rotor is formed by a rotor head, to which multiple rotor blades are attached on the outer circumference, and the rotor disk of the screen passed over by the rotor blades comprises multiple bar-shaped elevations.

According to the invention, the angle of intersection between the working edge of the rotor blades pointing in the direction of rotation and the shear edge of the elevations pointing counter to the direction of rotation remains constant radially outwardly, at least in sections, and/or increases, at least in sections.

In this way, it is achieved that the dirt along the shear edge of the elevation is able to migrate radially outwardly, and is not pinched between the rotor blades and the elevation. This promotes efforts to keep the screen free, and reduces wear. In addition, this counteracts further comminution of the impurities, in particular of plastic parts, which can thus be removed more easily. The reduced comminution also has process- and energy-related advantages.

The size, speed, and trajectory of the soil particles are of significance. If the soil particle is smaller than the distance between the rotor and the elevation, it is, in general, also smaller than the perforation in the screen, thus not resulting in any major problems.

If, in contrast, the soil particle is larger, it is to be removed to the outside, and not be pinched between the rotor and the elevation or the screen.

The contaminants are thus brought to a certain speed both by tractive forces in the suspension, and by contact with the rotor.

A distinction must be made between two cases. In the first case, the contaminant is not located in the immediate vicinity of the rotor and is entrained by the surrounding suspension. The forces acting on the contaminant, as well as the force acting by the contaminant on the screen or on the elevations, are then limited to the tractive forces in the suspension. The resulting wear on the elevation or the screen is low. Comminution of the contaminant itself will thus, in general, not take place. In the second case, direct contact occurs between the rotor, the contaminant, and the elevation or screen, wherein the introduced forces can increase considerably. As a result, the formation of the elevations according to the invention is significant.

Frequently, it already suffices when the angle of intersection between the working edge and the shear edge remains constant radially outwardly. So as to achieve the desired effect, however, it is advantageous in the process when the angle of intersection between the working edge and the shear edge remains constant radially outwardly across at least ⅔ of the length of the working edge, or even across the entire length of the working edge.

The least wear of the elevations arises when the constant angle of intersection between the working edge of the rotor and the shear edge of the elevation is 90°, since the fibers and impurities are then transported radially outwardly parallel to the respective elevation.

The transport of the impurities radially outwardly, however, can be intensified by radially outwardly increasing the angle of intersection between the working edge and the shear edge. The impurities are forced out of the wedge region.

It is advantageous in the process when the angle of intersection between the working edge and the shear edge increases radially outwardly across at least ⅔ of the length of the working edge, or even across the entire length of the working edge.

For pulping and wear, it has proven to be optimal when the angle of intersection between the working edge and the shear edge is between 80 and 120°, and preferably between 80 and 110°.

Depending on the fibrous stock and the process stage, the geometry of the elevations can be adapted in such a way that a greater deflaking or greater cleaning effect is achieved.

Depending on the type of the raw fiber material, or the shape and size of the vat, the screen surface or the rotor, it may be advantageous when the working edge of the rotor blades in the region of the passed-over screen surface and/or the shear edge of the elevations extends at least predominantly in a straight manner, or is at least predominantly formed by straight sections, or extends at least predominantly in a curved manner.

With respect to the load and the wear, but also for simplifying the design, it is advantageous when the screen has a rigid design.

Depending on the size of the vat, or the type and location of the rotor, it may be advantageous when the screen surface is curved or planar.

In the interest of a simple design, it often already suffices when the width of the elevations remains constant radially outwardly in the direction of rotation.

However, in particular in sections experiencing greater wear of the elevations, for example in the case of radially outwardly increasing angle of intersections between the working edge and the shear edge, it may be advantageous when also the width of the elevations increases radially outwardly, at least in sections, in the direction of rotation.

For efficient pulping, at least some, and preferably all, elevations should extend radially outwardly across the entire length of the working edges.

However, it may be advantageous, in particular with uneven wear of the elevations, when at least some elevations only extend radially outwardly across a section of the working edge.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 6 shows a partial top view onto the screen comprising widening elevations;

FIG. 7 shows a top view onto the screen, comprising elevations extending only across a radial section;

FIG. 8 shows a partial top view onto the screen and elevations, comprising a profiled shear edge; and FIG. 9 shows a partial top view onto the screen and elevations, comprising straight sections.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
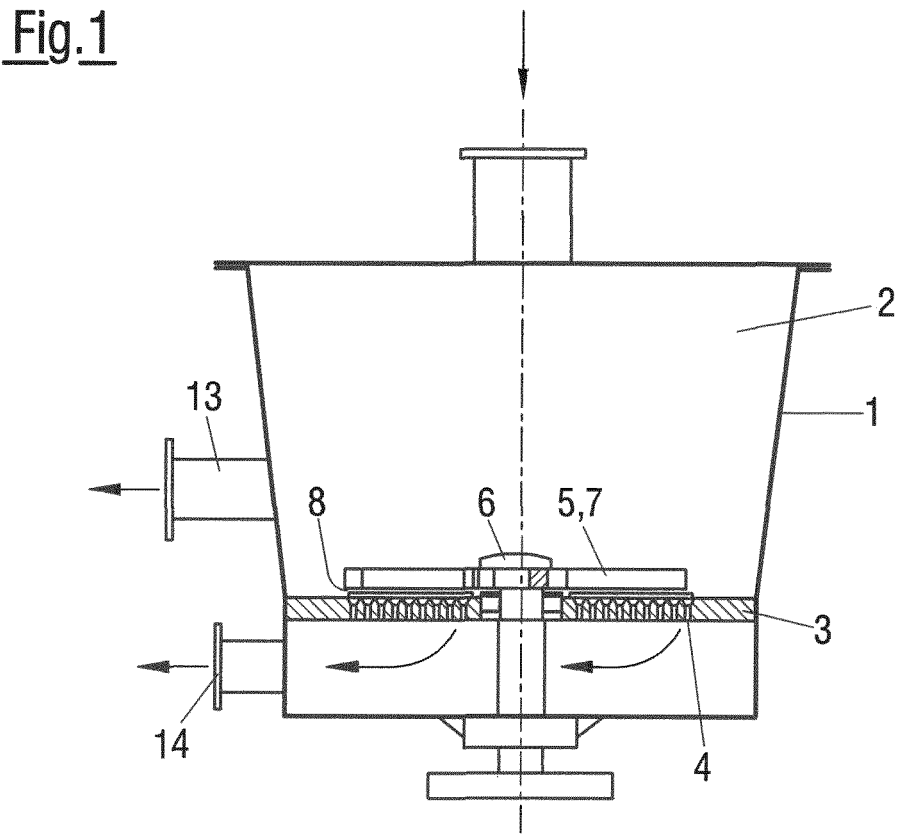
FIG. 1 shows a schematic longitudinal sectional view through a pulper.

Referring now to the drawings, and more particularly to FIG. 1, there is shown a pulper. The pulper is formed by a cylindrical vat 1 that is open at the top, to which the raw fiber material and water are added. A drivable rotor 5 which includes multiple rotor blades 7 may ensure that the raw fiber material is mixed, comminuted, and suspended in water. The density of the stock in the pulper is between 2 and 7%.

The vat 1 is divided into two chambers by the screen 3. The rejects at the screen 3 are discharged through the discharge connector 13.

The accepts drawn off through the screen openings 4 via the accepts connector 14 in the form of the fibrous stock suspension 2 are further treated in downstream devices and processed into paper webs in a paper making machine.

The rotor 5, or the rotor blades 7 thereof, during the rotation, pass over a surface of a screen 3 that has multiple screen openings 4 therein, thereby preventing clogging thereof.

The screen 3, including the upstream rotor 5, is usually situated at the bottom of the vat 1, as is apparent in FIG. 1.

However, it may also be advantageous or necessary to arrange this on a vat wall. Such horizontal pulpers are used in particular beneath the paper making machine during the treatment of scrap.

Due to the load experienced by the screen 3, and to simplify production, it has a planar and rigid design. The screen openings 4 are circular, wherein, however, also oval or bean-shaped forms are possible, for example.

The rotor 5, on the one hand, ensures that the raw fiber material is pulped and deflaked and, on the other hand, that potential impurities or foreign substances are cleared from the screen surface. In the process, the axis of rotation of the rotor 5 is situated perpendicularly on the screen surface.

The rotor 5 comprises a relatively large rotor head 6, having by way of example six rotor blades 7 attached at the outer circumference thereof. By way of the large rotor head 6, the formation of pockets of non-pulped, entrained raw material (plates or bales) can be effectively combatted.

Figure 2:
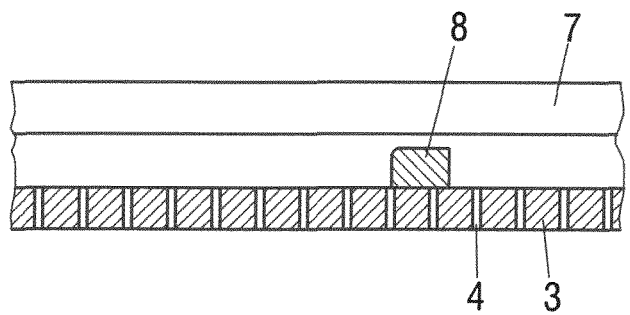
FIG. 2 shows a partial sectional view through the screen of the pulper.

On the side facing the rotor 5, the screen 3 according to FIGS. 1 and 2 is provided with bar-shaped elevations 8, which intensifies the pulping and cleaning action. If the raw materials have few impurities, the elevations 8, as is apparent in FIG. 8, can also include profiled, here saw tooth-shaped, shear edges 12, which enhances deflaking.

These bar-shaped elevations 8 have a height of at least 2 mm above the screen surface and can be formed in one piece with the screen 3, or as a separate element, or these can be formed in each case by a welding bead.

So as to simplify the use of as many rotor designs as possible, it may be advantageous to assemble the elevations 8 according to FIG. 9 from multiple straight sections, even if, as a result, the angle of intersection 9 only remains constant in sections and/or increases in sections.

Figure 3:
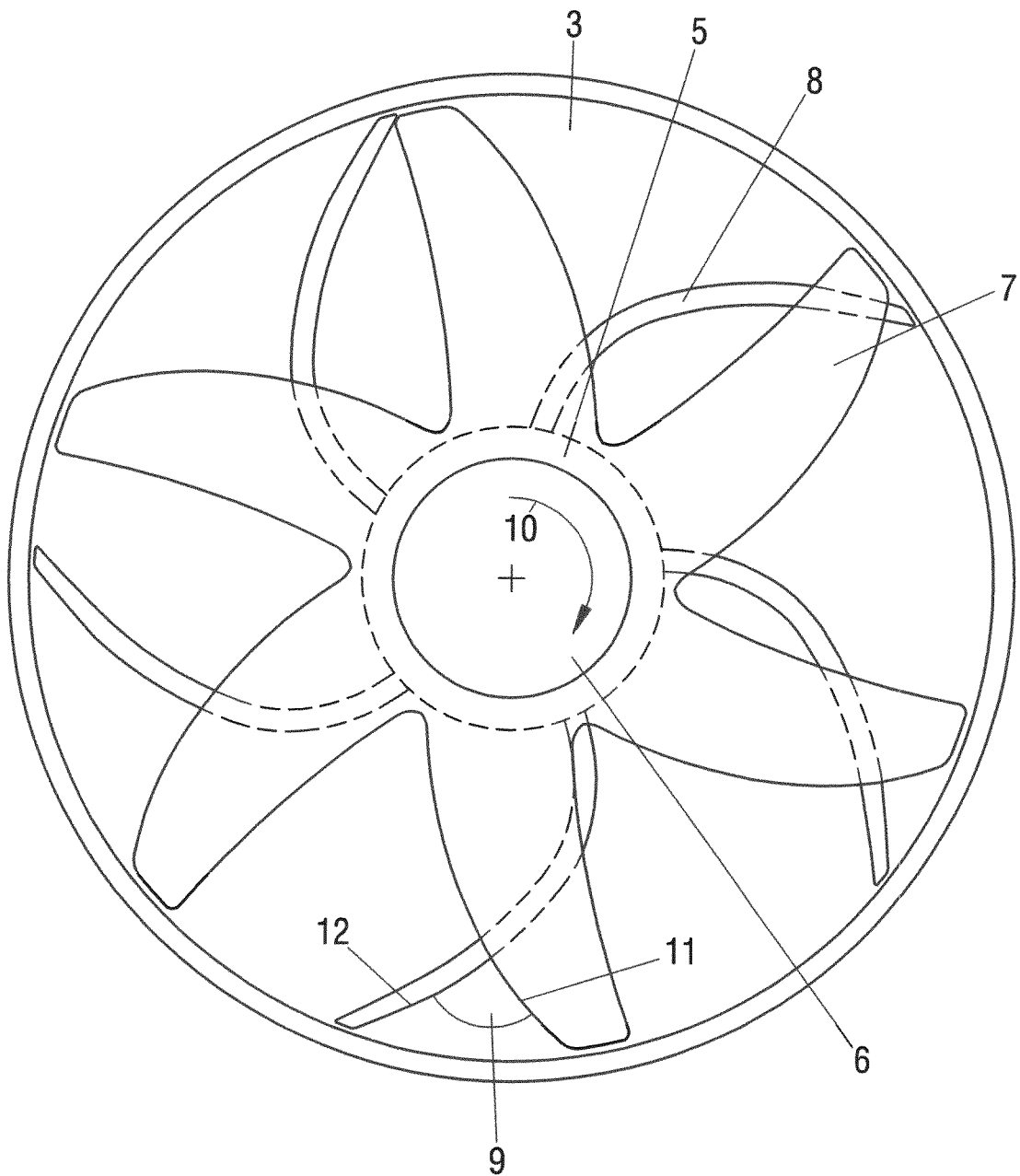
FIG. 3 shows a top view onto the screen including a rotor.
Figure 5:
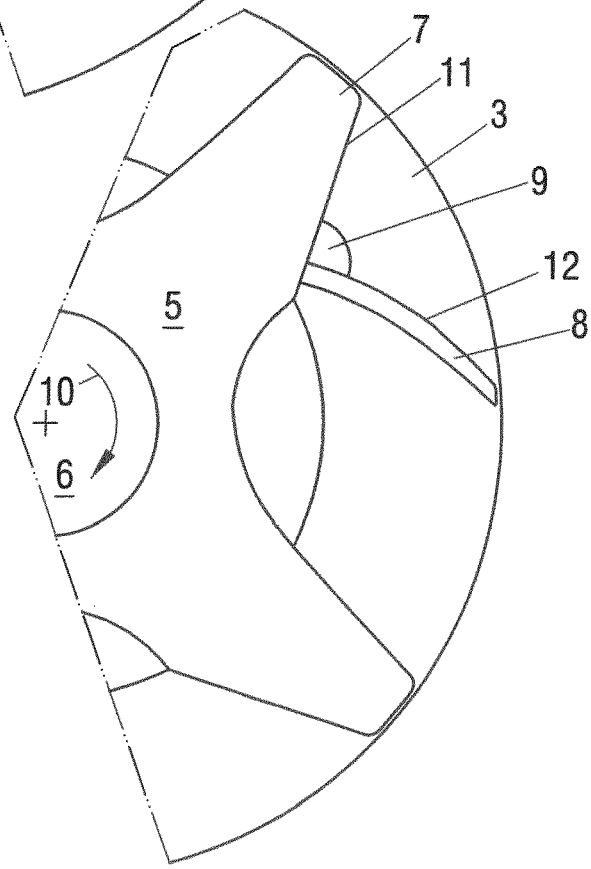
FIG. 5 shows a partial top view onto the screen and the rotor, comprising straight working edges.

The working edges 11 of the rotor blades 7 pointing in the direction of rotation 10 of the rotor 5 are, as is apparent in FIG. 3, convexly curved in the direction of rotation 10. If necessary, the working edges 11, however, in accordance with FIG. 5, can also, entirely or at least partially, comprise straight sections.

However, it is essential for the invention that the angle of intersection 9 between the working edge 11 of the rotor blades 7 and the shear edge 12 of the elevations 8 pointing counter to the direction of rotation 10 remains constant radially outwardly across the entire radial extension of the elevations 8 or, as is shown in FIG. 3, increases radially outwardly and ranges between 90 and 110°.

Figure 4:
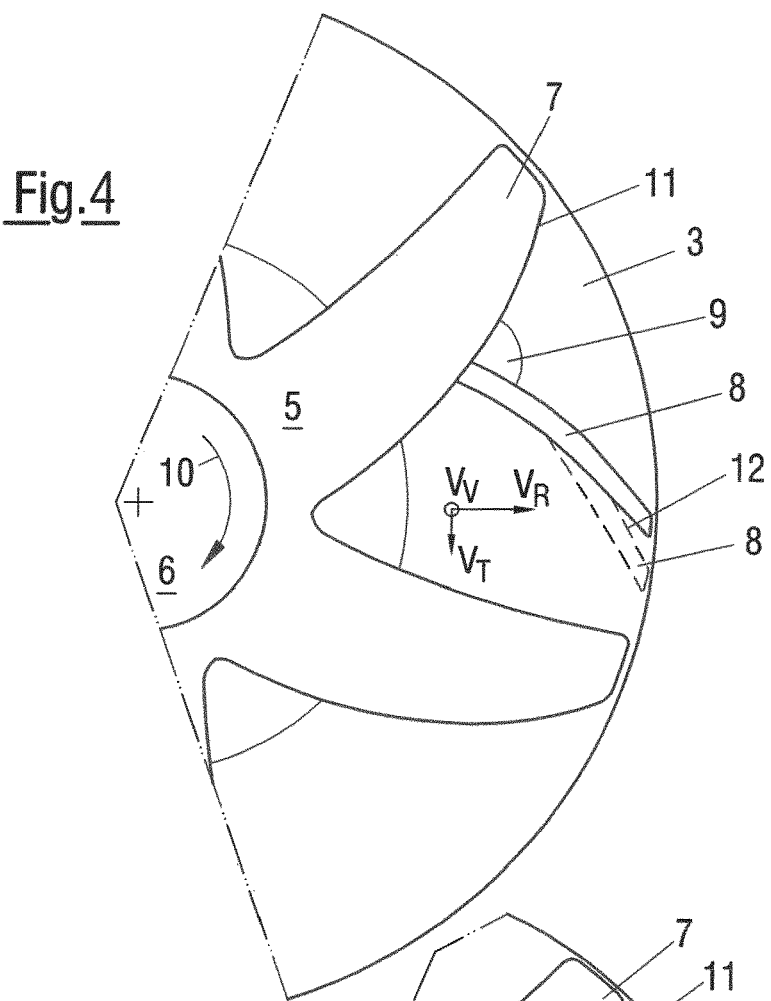
FIG. 4 shows a different partial top view onto the screen and the rotor, having a consistent and sectionally increasing angle of intersection.

FIG. 4 shows a variant in this regard, in which the angle of intersection 9 remains constant in the case of the elevation 8 illustrated with a continuous line, and increases in a radially outer section of the screen 3 in the case of the elevation 8 illustrated with a discontinuous line.

In particular in sections experiencing greater wear of the elevations 8, for example in the case of radially outwardly increasing angles of intersection 9 between the working edge 11 and the shear edge 12, it may be advantageous when the width of the elevations 8 increases radially outwardly in the direction of rotation, as is apparent in FIG. 6.

In contrast thereto, FIG. 7 shows an approach in which the elevations 8 only extend across a radial section of the screen 3. This allows optimizations, in particular in the case of irregular wear of the elevations 8.

Regardless of the specific design of the working edge 11 of the rotor 5 and of the shear edge 12 of the elevation 8, it is generally ensured that the impurities are pushed radially outwardly by the working edges 11 of the rotor blades 7, along the shear edges 12 of the elevations 8. Accordingly, the risk of dirt becoming pinched between the rotor blades 7 and the elevation 8 is decreased, which affects wear accordingly positively.

In addition, in this way also an optimization of the tractive and shear forces takes place, along with improved pulping and a reduced energy consumption.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pulper for circulating a fibrous stock suspension which is present in a vat, comprising:
    at least one screen including a screen surface with a plurality of screen openings therein, the at least one screen further including a plurality of bar-shaped elevations, each elevation defining a shear edge that points in a first direction;
    a rotor that is configured to pass over the screen surface, the rotor being formed by a rotor head and a plurality of rotor blades attached to the rotor head, each rotor blade defining a working edge that points in a second direction which is opposite to the first direction, the second direction being a direction of rotation of the rotor,
    wherein an angle of intersection between the working edge of each rotor blade and the shear edge of each elevation remains constant radially outwardly, at least in sections, and/or increases, at least in sections, the angle of intersection being between 80° and 120°.

2. The pulper according to claim 1, wherein each working edge has a length, wherein the angle of intersection remains constant radially outwardly at least across two-thirds of the length of each working edge.

3. The pulper according to claim 2, wherein the angle of intersection remains constant radially outwardly across the entire length of each working edge.

4. The pulper according to claim 1, wherein the angle of intersection is constant at 90°.

5. The pulper according to claim 1, wherein each working edge has a length, wherein the angle of intersection increases radially outwardly at least across two-thirds of the length of each working edge.

6. The pulper according to claim 5, wherein the angle of intersection increases radially outwardly across the entire length of each working edge.

7. The pulper according to claim 1, wherein the working edge of each rotor blade extends at least predominantly in a straight manner.

8. The pulper according to claim 1, wherein the working edge of each rotor blade is at least predominantly formed by a plurality of straight sections.

9. The pulper according to claim 1, wherein the working edge of each rotor blade extends at least predominantly in a curved manner.

10. The pulper according to claim 1, wherein the at least one screen has a rigid design.

11. The pulper according to claim 1, wherein the screen surface is one of curved and planar.

12. The pulper according to claim 1, wherein each elevation has a width, wherein the width of each elevation remains constant radially outwardly in the direction of rotation of the rotor.

13. The pulper according to claim 1, wherein each elevation has a width, wherein the width of each elevation increases radially outwardly, at least in sections, in the direction of rotation of the rotor.

14. The pulper according to claim 1, wherein each working edge has a length, wherein at least some elevations extend radially outwardly across the entire length of each working edge.

15. The pulper according to claim 1, wherein at least some elevations only extend radially outwardly across a section of each working edge.

16. The pulper according to claim 1, wherein the shear edges of at least some elevations have a profiled design.

17. The pulper according to claim 1, wherein the shear edge of each elevation extends at least predominantly in a straight manner.

18. The pulper according to claim 1, wherein the shear edge of each elevation is at least predominantly formed by a plurality of straight sections.

19. The pulper according to claim 1, wherein the shear edge of each elevation extends at least predominantly in a curved manner.

20. The pulper according to claim 1, wherein the angle of intersection lies in a plane that is perpendicular to an axial direction of the pulper.

* * * * *